UNITED STATES PATENT OFFICE.

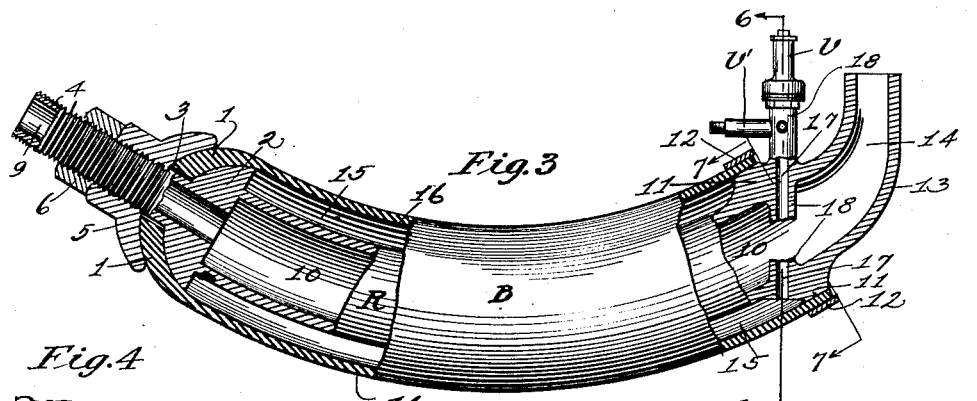

OTTO W. DOLPH, OF LOS ANGELES, CALIFORNIA.

VULCANIZING AIR-BAG.

1,379,397.  Specification of Letters Patent.  Patented May 24, 1921.

Application filed June 11, 1920. Serial No. 389,761.

*To all whom it may concern:*

Be it known that I, OTTO W. DOLPH, a citizen of the United States, and a resident of Los Angeles, in the county of Los Angeles, State of California, have invented new and useful Improvements in Vulcanizing Air-Bags, of which the following is a specification.

This invention relates to means insertible in a vehicle tire for holding said tire in firm contact with the vulcanizing mold and for applying heat to the interior of the tire during the vulcanizing operation, in addition to the usual application of heat to the exterior of the tire, so as to more quickly cook the rubber of a tire and thus facilitate the vulcanizing operation.

Heretofore, especially in a retreading operation, a tire has been held in a quarter or third sector mold by means of a bag filled with sand or other suitable material inserted in the tire so as to hold the tire extended into firm contact with the mold in a manner the same as if the tire were inflated, and the heat has been applied by passing steam through the chambers of the mold and applying heat only to the periphery of a tire. It will be readily recognized that the application of heat in such a manner requires a greater length of time for a retreading or vulcanizing operation than if the heat were also applied on the opposite side of the tire tread, and it is a main object therefore, of this invention, to provide means which will at one time serve the purpose of the usual sand bags and also provide heat within said bag in such a manner as will facilitate the vulcanizing operation substantially and also provide a more efficient vulcanizing means.

Another object is to provide in a vulcanizing mold a bag capable of being inflated with an element such as air for distending the tire during the vulcanizing operation, and having a steam passage therethrough whereby live steam may be circulated through the bag for applying heat to the interior tire.

I accomplish the above and other objects by means of the structure shown in the accompanying drawing, embodying one practical form of device, in which:

Figure 1 is an elevation of a mold with a tire therein and my device shown in operative connection therewith, partly in section.

Fig. 2 is a partial end elevation of the same.

Fig. 3 is an enlarged view of my vulcanizing device, partly in section.

Fig. 4 is a section of the same on line 4—4 of Fig. 1.

Fig. 5 is a left hand end view of the same.

Fig. 6 is a section thereof on line 6—6 of Fig. 3.

Fig. 7 is a section of the same on line 7—7 of Fig. 3.

Similar characters of reference are employed throughout the specification and in the several views of the drawing for indicating the same and like parts.

A practical form of device for carrying out the objects of my invention may consist of a flexible bag B having a steam receptacle R therein and adapted to be held within a tire T in a mold M, as shown in Fig. 1, particularly. Bag B has a substantially thickened end portion 1 which is adapted to be clamped on a rounded enlargement 2 of the receptacle R and an opening 3 therein is adapted to receive the extended threaded stem 4 of said receptacle. A washer 5 is threaded on said stem for tight engagement with the end portion 1 of the bag and is held by means of a lock nut 6. Said stem may be connected with the steam chamber 7 of the mold M by means of a flexible tube 8 and the passage 9 of said stem communicates with the chamber 10 of receptacle R.

The other end of bag B is open and is adapted to be held on an annular enlargement 11 of receptacle R by means of a split ring clamp member 12, or otherwise, as shown in Figs. 3 and 7, and a curved extension 13 provided on this end of receptacle R and has a passage 14 therein which communicates with the chamber 10 of receptacle R and is adapted to be connected with the steam chamber 7 of the mold M, by means of a tube 8' thus providing means for circulating steam from the mold through the bag B, the space 15 of said bag being adapted to contain air for holding the walls 16 of the bag in firm engagement with the inner periphery of the tire T.

Air may be supplied to the space 15 of bag B by means of a passage 17 extending through a tubular portion 18 integrally formed with the receptacle R, as shown in Figs. 3 and 6, or separately formed and held therein so as to afford communication with the interior of the air bag from the exterior thereof and to prevent communication between the interior of the bag and the receptacle R. A relief valve V may be attached to the exterior of portion 18, as shown in Fig. 3, and a suitable air inlet valve V' may be provided for attachment thereto so as to inflate the bag B to a proper pressure and to provide means of relief for excess pressure which may be created in the bag due to the heat therein. A pressure gage G may be attached to the member 18 also, as shown for visibly indicating the obtaining pressure in the bag, and if necessary or desirable a suitable thermometer may be applied to the extension 13 of receptacle R so as to indicate the temperature therein, but this is not essential to the perfect operation of the device as is a matter of convenience.

In operation, the tire T is inserted in the tread forming portion M' of the mold M in the usual manner and the bag B containing the receptacle R is inserted in the manner shown in the tire T and may be connected by means of the tubes 8 and 8' with the steam chamber of the mold. The tire T and bag B are held in the mold by means of a plurality of clamps C. The inflated bag B serves to hold the tire in firm contact with the mold and steam from the chamber 7 of the mold is freely circulated through the receptacle R and thus serves to apply heat from the interior of the tire as well as from the exterior thereof, simultaneously and to a uniform extent, thus providing greater efficiency in molds of this character and effecting the complete cooking of the rubber of the tires more quickly than otherwise. As usual, only a portion of a tire is cured at a time, and the tire is advanced, segment by segment in the mold until the complete curing thereof is effected.

What I claim, is:

1. In a device of the character described, a flexible air bag closed at the ends and having a steam passage therethrough and closed against communication therewith.

2. A vulcanizing device including an inflatable bag having an internally held steam receptacle closed against communication with the interior thereof.

3. A vulcanizing device including an inflatable air bag having an internally held steam receptacle closed against communication with the interior of said bag and inlet means therefor and connected with a source of steam supply, for the purpose set forth.

4. A vulcanizing device including an inflatable bag, a steam receptacle therein and closed from the interior thereof, and means for detachably holding said members together.

5. A vulcanizing device including an inflatable bag, a steam receptacle therein open at the ends, means for detachably holding said members together for use, and inlet means for said bag closed against communication with said receptacle.

6. A vulcanizing device including an inflatable bag, of arcuate form, an arcuate steam receptacle removably held therein, inlet and outlet therefor, means for circulating steam through said receptacle, and means for supplying an element to and for inflating said bag.

7. A vulcanizing device including a flexible bag of arcuate form having an air inlet, an arcuate rigid member in said bag having a passage for circulating steam therethrough, means for supplying air to said bag, and means for supplying steam to said member.

8. A vulcanizing device including an inflatable bag curved so as to fit in a tire, a curved steam receptacle insertible in and detachably held in said bag and closed against communication with the interior of said bag, means for holding said bag and receptacle in operative relation, and means for supplying air and steam to said bag and said receptacles, respectively, as described.

9. A vulcanizing device including a flexible member adapted for contact with the internal surface of a tire, and having an inlet for admitting air thereto, an inflating element, a hollow member held in said flexible member and having a chamber therein closed from communication with the interior of said flexible member, and means for circulating steam through said hollow member.

10. A vulcanizing device including a flexible bag having an enlarged opening at one end and a restricted opening at the other end thereof, a rigid member insertible through said enlarged opening and having a stem extending through said restricted opening, means adjustable on said stem for holding said members together for use, and means for supplying air and steam respectively, to the interiors of said members, for the purpose described.

11. A vulcanizing device including a flexible bag having openings at the ends thereof, a hollow member held in and closing the ends of said bag, means for holding said members together for use, and means for supplying air and steam respectively, to the interiors of said members, as described.

12. A vulcanizing device including a flexible bag, a member held therein having a passage therethrough and having end enlargements forming closures for said bag and also forming an annular chamber around said inner member, and means for circulating steam through said inner member, for the purpose described.

13. A vulcanizing device including an inflatable air bag, an inner member therein having a passage therethrough and forming an annular chamber in said bag, means for admitting air to said annular chamber, and means for circulating steam through said inner chamber.

14. A vulcanizing device including relatively flexible and rigid hollow members of arcuate form supported one within the other and having their interiors closed against communication with each other, and means for admitting air and steam respectively to said members, for the purpose described.

15. A vulcanizing device having relatively flexible and rigid members of arcuate form detachably held together for use and having internal passages closed against communication with each other, inlet means for said flexible member, and inlet and outlet means for said rigid member, as set forth.

OTTO W. DOLPH.

Witnesses:
LUTHER L. MACK,
CHARLES C. MONTGOMERY.